US006353631B1

(12) United States Patent
Matsuura

(10) Patent No.: US 6,353,631 B1
(45) Date of Patent: Mar. 5, 2002

(54) QUADRATURE AMPLITUDE MODULATION SIGNAL DEMODULATION CIRCUIT HAVING IMPROVED INTERFERENCE DETECTION CIRCUIT

(75) Inventor: Hideki Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/241,089

(22) Filed: Feb. 1, 1999

(30) Foreign Application Priority Data

Jan. 30, 1998 (JP) .......................................... 11-019854

(51) Int. Cl.$^7$ ............................ H03H 7/30; H03H 7/40; H03K 5/159
(52) U.S. Cl. ........................................ 375/235; 375/346
(58) Field of Search .............................. 375/235, 232, 375/230, 229, 346, 348, 349, 278, 284, 285; 708/322, 323; 333/18, 28 R; 455/296, 312

(56) References Cited

U.S. PATENT DOCUMENTS

| 4,992,798 A | * 2/1991 | Nozue et al. ................ 342/362 |
| 5,005,185 A | * 4/1991 | Mizoguchi et al. .......... 375/235 |
| 5,682,125 A | * 10/1997 | Minuhin et al. ............... 333/18 |
| 5,790,597 A | * 8/1998 | Kurokami et al. ........... 375/233 |

FOREIGN PATENT DOCUMENTS

| JP | 55-133154 | 10/1980 |
| JP | 61-177033 | 8/1986 |
| JP | 61-187438 | 8/1986 |

* cited by examiner

*Primary Examiner*—Chi Pham
*Assistant Examiner*—Phuong Phu
(74) *Attorney, Agent, or Firm*—McGinn & Gibb, PLLC

(57) ABSTRACT

In a quadrature amplitude modulation signal demodulation circuit including first and second delay circuits for receiving an I-axis component and an Q-axis component of a baseband signal, a tap coefficient calculating circuit for calculating first tap coefficients in accordance with the delayed I-axis component and second tap coefficients in accordance with the delayed Q-axis component, an interference detection circuit for detecting a center of an interference signal included in the baseband signal, a control circuit for controlling delay time periods of the first and second delay circuits in accordance with an output signal of the interference detection circuit, first and second equalizers for equalizers the I-axis component and the Q-axis component in accordance with the first and second tap coefficients, and an adder for adding the output signals the first and second transversal equalizers, the interference detection circuit is constructed by a plurality of absolute value adders, each for adding an absolute value of one of the first tap coefficients and one of the second tap coefficients having the same timing, and a comparator for comparing output values of the absolute value adders with each other.

5 Claims, 6 Drawing Sheets

QUADRATURE AMPLITUDE MODULATION SIGNAL DEMODULATION CIRCUIT HAVING IMPROVED INTERFERENCE DETECTION CIRCUIT

BACKGROUND OF THE INVENTION

1. Field of the Invention

The present invention relates to a quadrature amplitude modulation (QAM) digital radio communication system, and more particularly, to an interference detection circuit in a demodulation circuit thereof.

2. Description of the Related Art

Recently, in a QAM digital radio communication system, a so-called single frequency transit system is adopted, thus simplifying the hardware of the system. This will be explained later in detail.

In the single frequency transit system, however, since there are various kinds of interference included in a desired signal, an interference detection circuit is provided to compensate for the interference without increasing the number taps of a transversal equalizer circuit.

A prior art interference detection circuit is constructed by a comparator which monitors all the tap coefficients used for the transversal equalizer circuit. As a result, one of the tap coefficients having a maximum value is detected so as to indicate a center of each interference signal. This also will be explained later in detail.

In the above-mentioned prior art interference detection circuit, however, if the phase of each interference signal is deviated, the tap coefficients fluctuate, so that it is impossible to accurately indicate the center of each interference signal.

SUMMARY OF THE INVENTION

It is an object of the present invention to provide a QAM signal demodulation circuit having an improved interference detection circuit capable of accurately indicating the center of each interference signal.

According to the present invention, in a QAM signal demodulation circuit including first and second delay circuits for receiving an I-axis component and an Q-axis component of a baseband signal, a tap coefficient calculating circuit for calculating first tap coefficients in accordance with the delayed I-axis component and second tap coefficients in accordance with the delayed Q-axis component, an interference detection circuit, for detecting a center of an interference signal included in the baseband signal, a control circuit for controlling delay time periods of the first and second delay circuits in accordance with an output signal of the interference detection circuit, first and second transversal equalizers for equalizing the I-axis component and the Q-axis component in accordance with the first and second tap coefficients, and an adder for adding the output signals the first and second transversal equalizers, the interference detection circuit is constructed by a plurality of absolute value adders, each for adding an absolute value of one of the first tap coefficients and one of the second tap coefficients having the same timing, and a comparator for comparing output values of the absolute value adders with each other.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment prior art QAM demodulation circuits will be explained with reference to FIGS. 1, 2, 3, 4, 5, 6 and 7.

Figure 1:
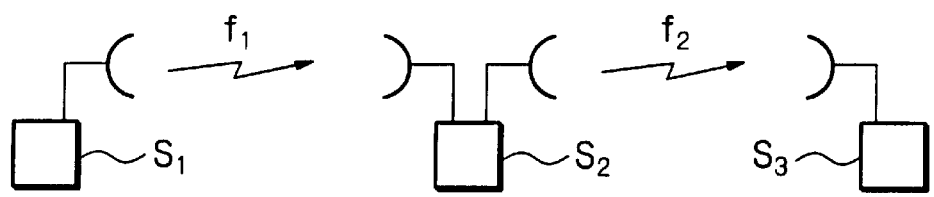
FIG. 1 is a diagram illustrating a first prior art QAM radio communication system.

In FIG. 1, which illustrates a first QAM radio communication system, a transmitter station $S_1$ transmits a signal having a carrier frequency of $f_1$ to a transit station $S_2$, which in turn transmits a signal having a carrier wave frequency of $f_2$ different from the carrier wave frequency $f_1$ to a receiver station $S_3$. Note that two or more transit stations generally can be provided; however, only one transit station is provided for simplifying the description. In this case, since the carrier wave frequency $f_1$ of the signal received by the transit station $S_2$ is different from the carrier wave frequency $f_2$ of the signal transmitted from the transit station $S_2$, the two signals hardly interferes with each other. On the other hand, the hardware of the transit station $S_2$ becomes complex.

Figure 2:
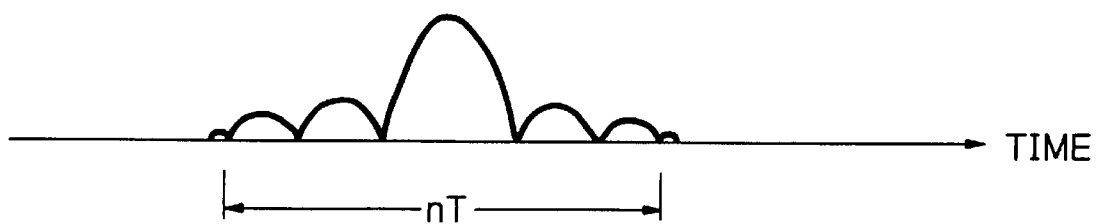
FIG. 2 is a diagram showing the strength of the signal received by the receiver station of FIG. 1.

In FIG. 2, which shows the strength of the signal received by the receiver station $S_3$ of FIG. 1, since the interference of the signals is small, the number "n" of taps, which is used in a transversal equalizer circuit of a QAM demodulation circuit that will be explained later, is relatively small. Note that T of FIG. 2 shows a time period of the signal having a carrier wave frequency $f_2$ or half of the period.

Figure 3:
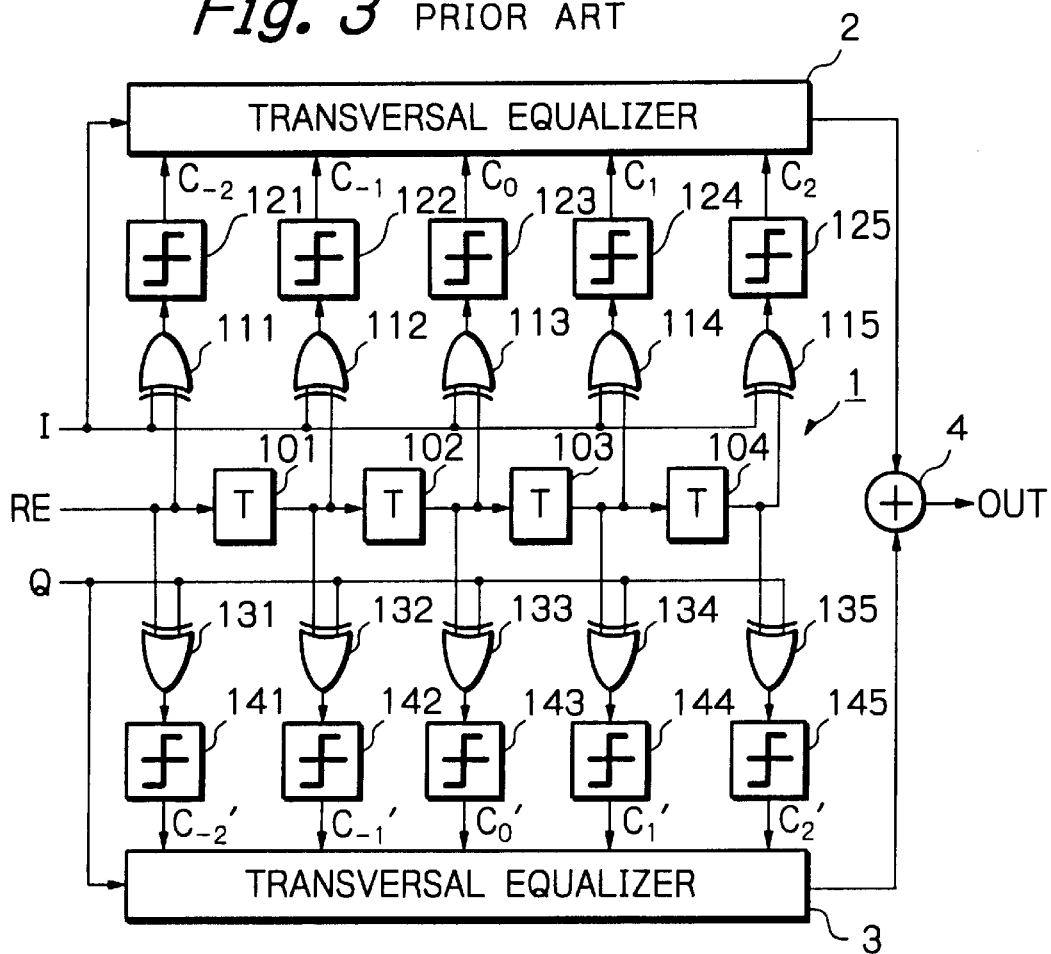
FIG. 3 is a circuit diagram of the transversal equalizer circuit of FIG. 1.
Figure 4:
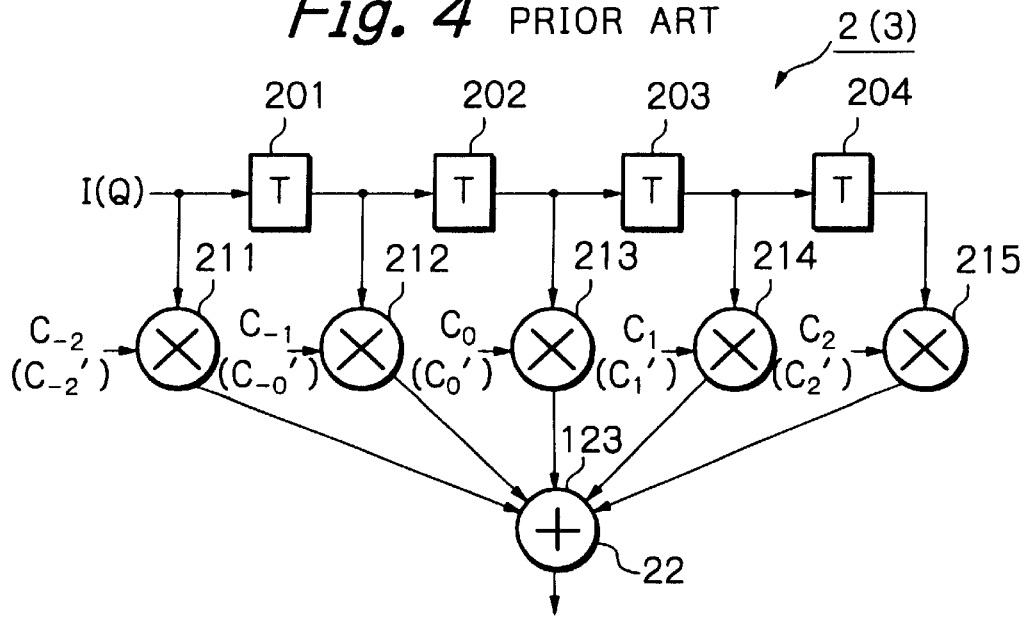
FIG. 4 is a detailed circuit diagram of the transversal equalizer of FIG. 5.

If "n" is equal to 5, the transversal equalizer circuit of the QAM signal demodulation circuit in the receiver station 3 is illustrated in FIGS. 3 and 4. In FIG. 3, the transversal equalizer circuit is constructed by a tap (filter) coefficient calculating circuit 1, transversal equalizer 2 and 3, and an adder 4. Also, I and Q designate I-axis baseband data and Q-axis baseband data, respectively, and RE designates an error signal.

The tap coefficient calculating circuit 1 uses a zero-forcing (ZF) method to determine tap coefficients $C_{-2}$, $C_{-1}$, $C_0$, $C_1$ and $C_2$ for the I-axis baseband data and tap coefficients $C_{-2}'$, $C_{-1}'$, $C_0'$, $C_1'$ and $C_2'$ for the Q-axis baseband data.

The tap coefficient calculating circuit 1 is formed by serially-connected flip-flops 101 through 104 each for delaying the error signal RE by the time period T, exclusive OR circuits 111 through 115 for detecting correlation values between the I-axis data and the error signal RE, and integrators 121 through 125 for integrating the output signals of the exclusive OR circuits 111 through 115, respectively. In this case, each of the integrators 121 through 125 includes a comparator for comparing the respective integrated value with a reference value. Therefore, the integrators 121 through 125 generate the tap coefficients $C_{-2}$, $C_{-1}$, $C_0$, $C_1$ and $C_2$, respectively. Also, the tap coefficient calculating circuit 1 is formed by exclusive OR circuits 131 through 135 for detecting correlation values between the Q-axis data and the error signal RE, and integrators 141 through 145 for integrating the output signals of the exclusive OR circuits 131 through 135, respectively. Also, in this case, each of the integrators 141 through 145 includes a comparator for comparing the respective integrated value with a reference value. Therefore, the integrators 141 through 145 generate the tap coefficients $C_{-2}'$, $C_{-1}'$, $C_0'$, $C_1'$ and $C_2'$ respectively.

In FIG. 4, which is a detailed circuit diagram of the transversal equalizer 2 (3) of FIG. 3, the transversal equalizer 2 (3) is formed by serially-connected flip-flops 201 through 204 each for delaying the I-axis baseband data (the Q-axis baseband data) by the time period T, multipliers 211 through 215 for multiplying the I-axis baseband data by the tap coefficients $C_{-2}$, $C_{-1}$, $C_0$, $C_1$ and $C_2$, ($C_{-2}'$, $C_{-1}'$, $C_0'$, $C_1'$ and $C_2'$), and an adder 22 for adding the output signals of the multipliers 211 through 215.

According to the transversal equalizer circuit of FIG. 3, the intersymbol interference can be compensated for in the QAM radio communication system of FIG. 1.

Figure 5:
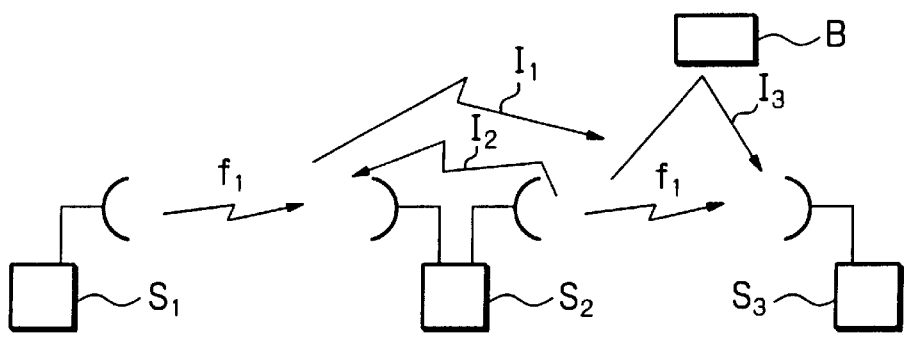
FIG. 5 is a diagram illustrating a second prior art QAM radio communication system.

In FIG. 5, which illustrates a second prior art QAM radio communication system, the carrier wave frequency $f_1$ of the signal received by the transit station $S_2$ is the same as the carrier wave frequency $f_1$ of the signal transmitted from the transit station $S_2$. This is called a single frequency transit system. As a result, the hardware of the transit station $S_2$ can be simplified. Also, effective use is made of frequencies in the system of FIG. 5.

In the system of FIG. 5, however, there are three kinds of interference due to the single frequency system. First, an overreach interference occurs. That is, an interference signal $I_1$ having the same carrier wave frequency $f_1$ bypasses the transit station $S_2$, so that the interference signal $I_1$ reaches the receiver station $S_3$ earlier than the desired signal as indicated by $f_1$ in FIG. 5. Second, an in-station interference occurs. That is, an interference signal $I_2$ due to the coupling of receiving and transmitting antennas of the transit station $S_2$ is added to the desired signal $f_1$, so that the interference signal $I_2$ reaches the receiver station $S_3$ later than the desired signal $f_1$. Third, a reflection interference occurs. That is, an interference signal $I_3$ is reflected from a building B or the like, so that the interference signal $I_3$ reaches the receiver $S_3$ later than the desired signal $f_1$. Note that the interference signal $I_3$ also occurs in the system of FIG. 1.

Figure 6:
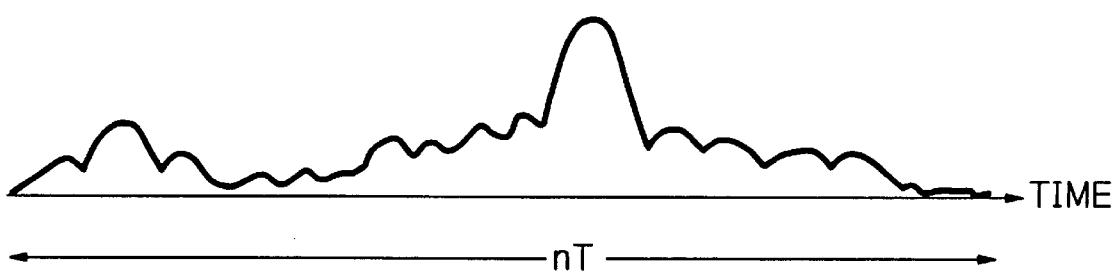
FIG. 6 is a diagram shoving the strength of the signal received by the receiver station of FIG. 5.

In FIG. 6, which shows the strength of the signal received by the receiver station $S_3$ of FIG. 5, since the interference signals $I_1$, $I_2$ and $I_3$ are added to the desired signal $f_1$, the number "n" of taps will be very large. For example, if the rate of the signal is 1 MHz, the tap number "n" is 120 in order to compensate for the interference signals $I_1$, $I_2$ and $I_3$ within ±4 µsec. Note that if the interval of the taps is T/2, the tap number "n" will be 240. This increases the transversal equalizer circuit of FIGS. 3 and 4 in size.

Figure 7:
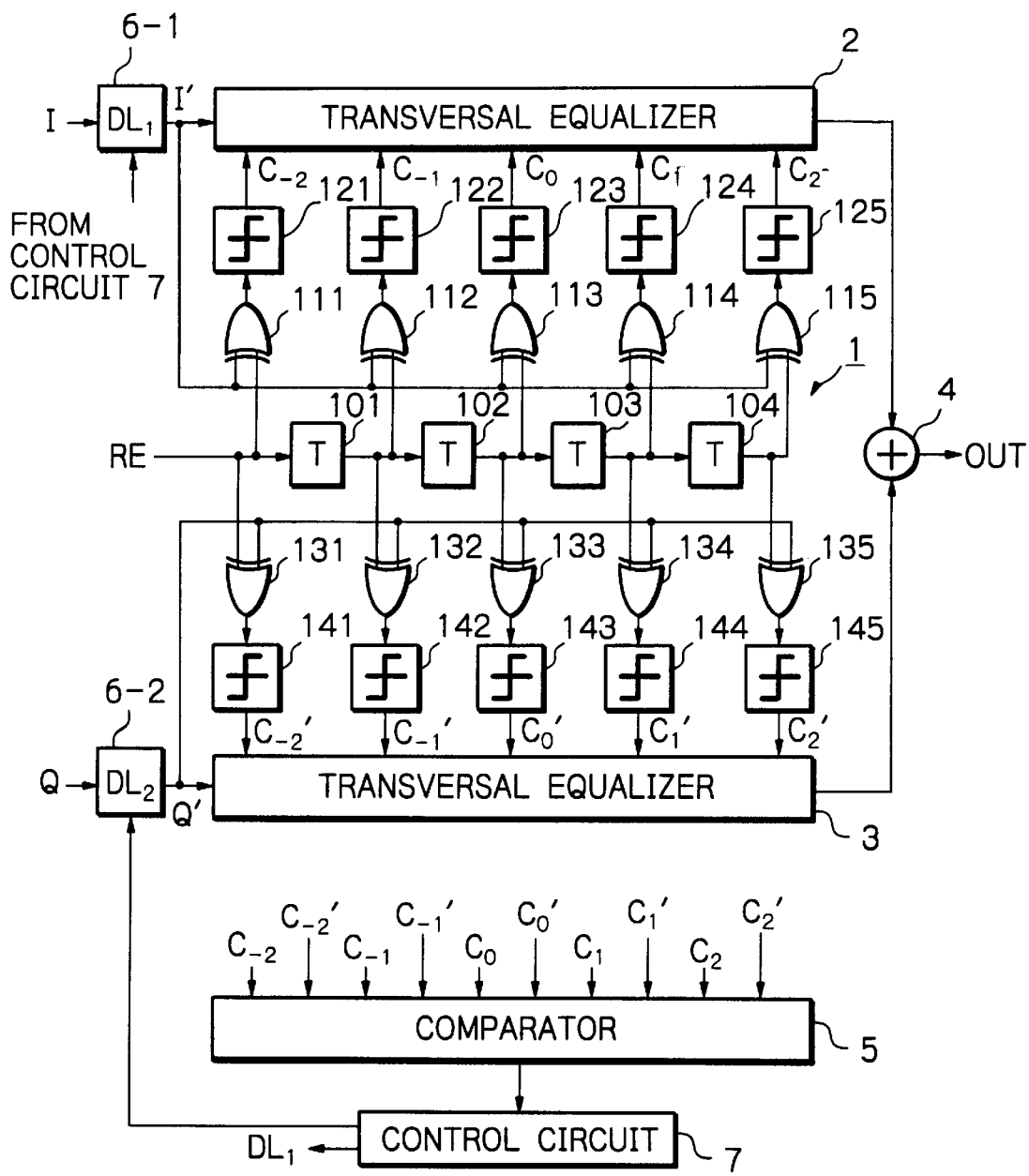
FIG. 7 is a circuit diagram of the transversal equalizer circuit of FIG. 5.

In order to decrease the tap number "n" an interference detection circuit 5 as illustrated in FIG. 7 is added to the transversal equalizer circuit of FIG. 3. That is, the interference detection circuit 5 is formed by a comparator which monitors all the tap coefficients $C_{-2}$, $C_{-2}'$, $C_{-1}$, $C_{-1}'$, $C_0$, $C_0'$ $C_1$, $C_1'$, $C_2$ and $C_2'$. As a result, the comparator 71 detects one of the tap coefficients $C_{-2}$, $C_{-2}'$, $C_{-1}$, $C_{-1}'$, $C_0$, $C_0'$ $C_1$, $C_1'$, $C_2$ and $C_2'$ having a maximum value, so as to indicate a center of the interference signals.

Also, a delay circuits 6-1 and 6-2 for receiving the I-axis baseband data and the Q-axis baseband data are connected to the transversal equalizers 2 and 3, respectively.

Each of the delay circuits 6-1 and 6-2 is formed by serially-connected flip-flops, and their delay times $DL_1$ and $DL_2$ are controlled by a control circuit 7 in accordance with the output signal of the interference detection circuit 5. For example, each of the serially-connected flip-flops has a switch connected to the input and output thereof, and therefore, such a switch is turned ON or OFF to adjust the delay time $DL_1$ ($DL_2$, . . . ).

The control circuit 7 is constructed by a computer which receives the output signal of the interference detection circuit 5. That is, the control circuit 7 controls the delay times $DL_1$ and $DL_2$ of the delay circuits 6-1 and 6-2, so that the tap coefficients $C_0$, and $C_0'$ have maximum values.

Thus, since each of the interference signals such as $I_1$, $I_2$ and $I_3$ is equalized by using a small number of taps, the number "n" of taps can be decreased.

In the transversal equalizer circuit including the interference detection circuit of FIG. 7, if the phase of each of the interference signals is deviated, the tap coefficients fluctuate, so that it is impossible to accurately indicate the center of each of the interference signals.

Note that it is possible for the control circuit 7 using complex software to compensate for the fluctuation of the tap coefficients due to the deviation of the phase of each of the interference signals. In this case, if the interference detection circuit of FIG. 7 is large in size, the compensating operation by the control circuit 5 is slow, so that the interference detection circuit of FIG. 7 cannot be applied to the compensation for the fluctuation of the tap coefficients in a mobile station.

Figure 8:
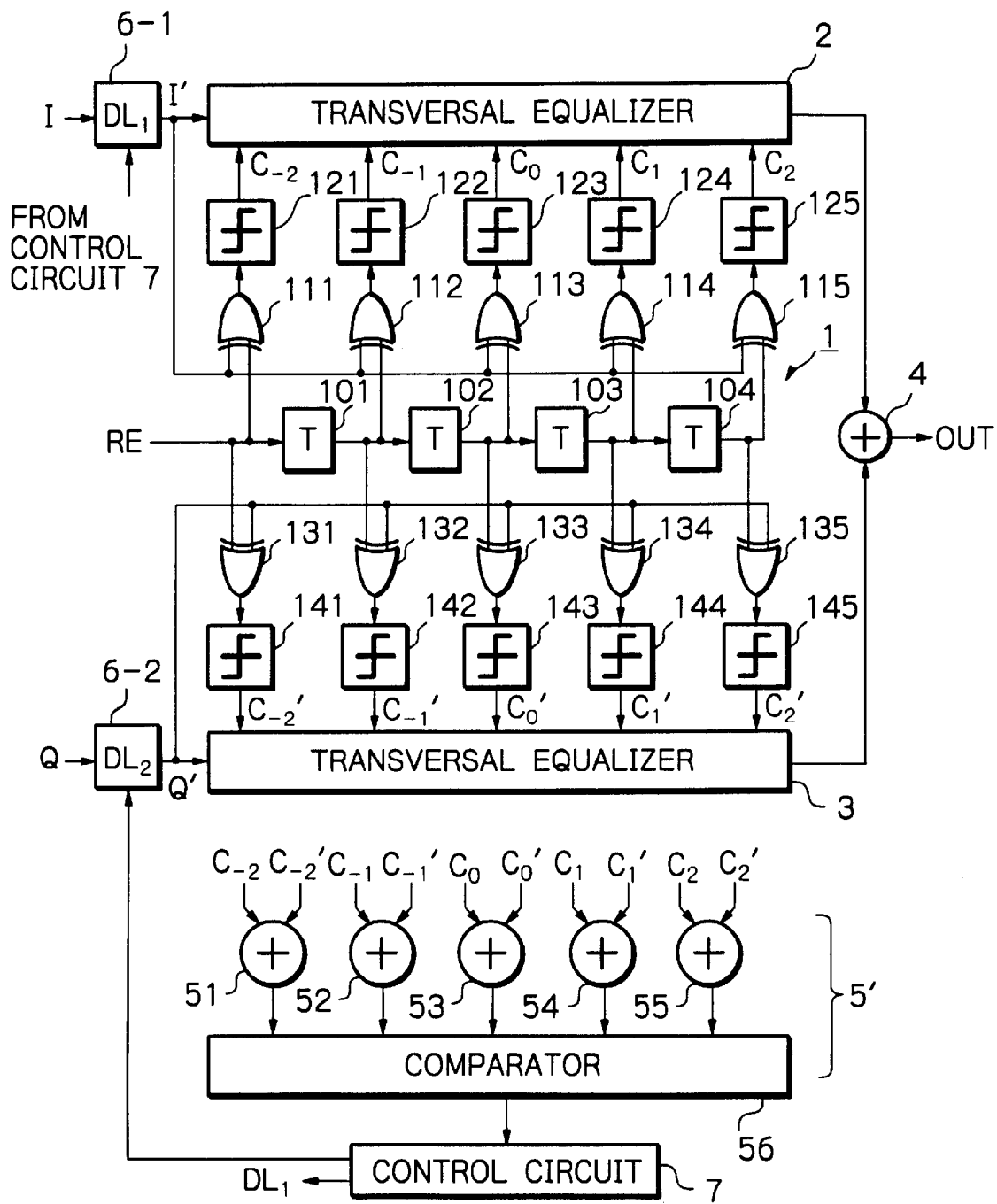
FIG. 8 is a circuit diagram illustrating an embodiment of the transversal equalizer circuit including an interference detection circuit according to the present invention.

In FIG. 8, which is an embodiment of the transversal equalizer circuit including an interference detection circuit according to the present invention, an interference detection circuit 5' is formed by absolute value adder 51 through 55 each receiving one of the tap coefficients $C_{-2}$, $C_{-1}$, $C_0$, $C_1$ and $C_2$, and one of the tap coefficient $C_{-2}'$, $C_{-1}'$, $C_0'$, $C_1'$ and $C_2'$, and a comparator 56.

In the interference detection circuit 5', an evolution function E.X for a two-dimensional model of P-channel and Q-channel on the basis of the ZF method is given by $$E.X = C_{PI} + C_{PQ} + C_{QI} + C_{QQ}$$

where $C_{PI}$ is a tap coefficient of the I-axis component of the P-channel;

$C_{PQ}$ is a tap coefficient of the Q-axis component of the P-channel;

$C_{QI}$ is a tap coefficient of the I-axis component of the Q-channel; and $C_{QQ}$ is a tap coefficient of the Q-axis component of the Q-channel. That is, the interference wave component of the P-channel is $C_{PI} + C_{PQ}$, and the interference wave component of the Q-channel is $C_{QI} + C_{QQ}$.

Note that the center of the interference signal is located in a tap which has the maximum tap coefficient. However, in an orthogonal digital signal such as a QAM signal, when the phase of the interference signal fluctuates against the phase of the desired signal, the ratio of the I-axis component to the Q-axis component in the interference signal fluctuates.

Figure 9:
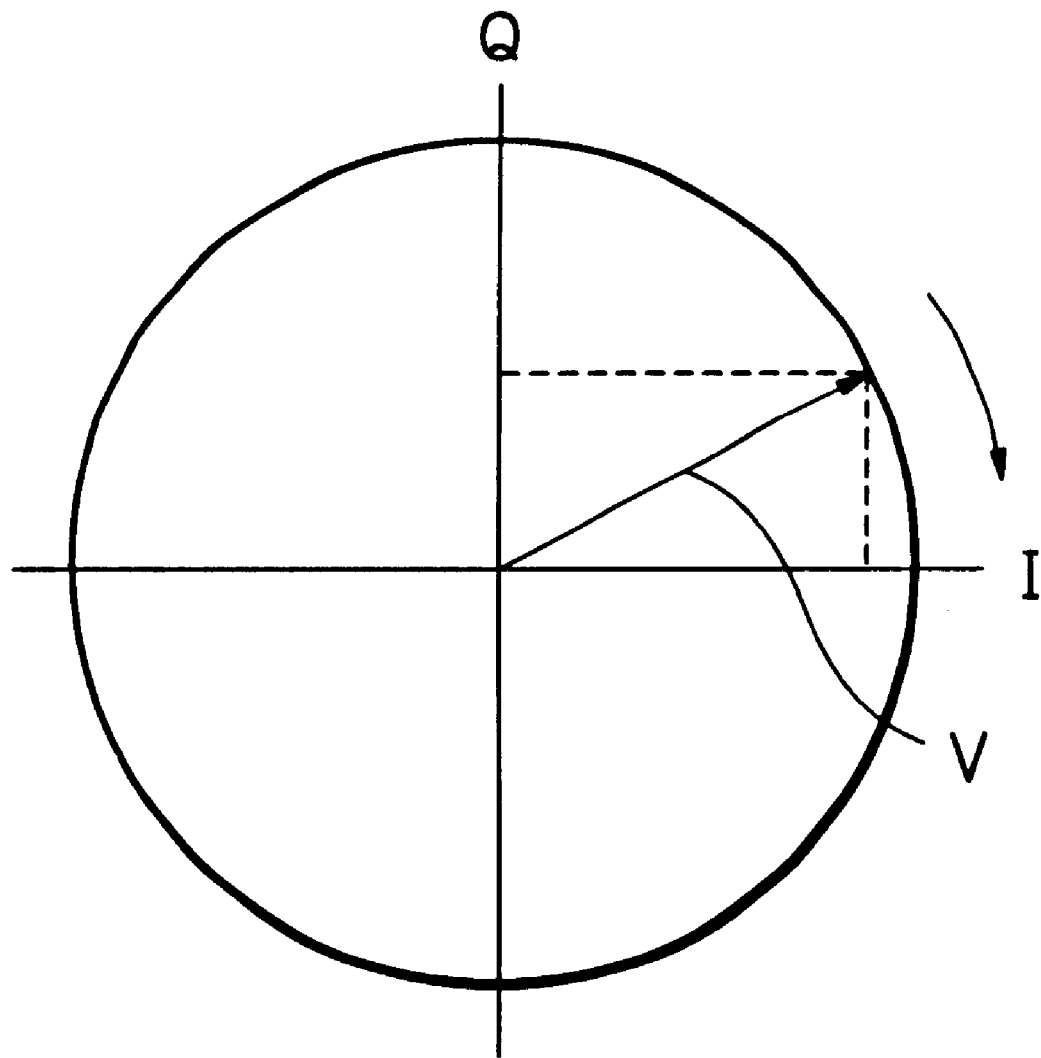
FIG. 9 is a diagram showing the phase change of an interference signal.

Therefore, the tap coefficients also fluctuates. Even in this case, the fluctuation of the tap coefficients does not mean the magnitude of the interference signal as shown in FIG. 9. That is, if the phase of the interference signal is changed from the Q-axis to the I-axis, magnitude of a vector V showing the interference signal does not change. Therefore, the magnitude of the vector V is obtained at one of the absolute value adders 51 through 55 by adding the tap coefficient of the I-axis to the tap coefficient of the Q-axis, and as a result, the magnitude of the interference signal at each tap is obtained. The comparator 56 detects one of the taps having the maximum magnitude of the vector V.

The control circuit 7 is constructed by a computer which receives the output signal of the comparator 56. That is, the control circuit 7 controls the delay times $DL_1$ and $DL_2$ of the delay circuits 6-1 and 6-2, so that the output signal of the adder 53 has the maximum value. Thus, an efficient compensation for the interference signals can be carried out.

As explained hereinabove, according to the present invention, the locations of the interference signals can be accurately detected without increasing the hardware.

What is claimed is:

1. A quadrature amplitude modulation signal demodulation circuit comprising:

a first delay circuit for receiving an I-axis component of a baseband signal;

a second delay circuit for receiving an Q-axis component of said baseband signal;

a tap coefficient calculating circuit, connected to said first and second delay circuits, for calculating first tap coefficients having a predetermined time period in accordance with said I-axis component and second tap coefficients having said predetermined time period in accordance with said Q-axis component;

an interference detection circuit, connected to said tap coefficient calculating circuit, for detecting a center for an interference signal included in said baseband signal;

a control circuit, connected to said interference detection circuit and said first and second delay circuits, for controlling delay time periods of said first and second delay circuits in accordance with an output signal of said interference detection circuit;

a first transversal equalizer, connected to said first delay circuit and said tap coefficient calculating circuit, for equalizing said I-axis component in accordance with said first tap coefficients;

a second transversal equalizer, connected to said second delay circuit and said tap coefficient calculating circuit, for equalizing said Q-axis component in accordance with said second tap coefficients; and an adder, connected to said first and second transversal equalizers, said interference detection circuit comprising:

a plurality of absolute value adders, each for adding an absolute value of one of said first tap coefficients to one of said second tap coefficients having the same timing as said one of said first tap coefficients; and a comparator, connected to said absolute value adders, for comparing output values of said absolute value adders with each other.

2. The demodulation circuit as set forth in claim 1, wherein said control circuit controls the delay times of said first and second delay circuits, so that the output signal of one of said absolute value adders located in a center of said absolute value adders has a maximum value within the output signals of said absolute value adders.

3. The demodulation circuit as set forth in claim 1, wherein said tap coefficient calculating circuit calculates said first and second tap coefficients by calculating correlation values between said I-axis and Q-axis components and a predetermined error signal using a Zero-Forcing method.

4. An interference detection circuit for detecting an interference signal in an orthogonal digital signal formed by an I-axis component and an Q-axis component, comprising:

a plurality of absolute value adders, each for adding an absolute value of one of first tap coefficients to one of second tap coefficients having the same timing as said one of first tap coefficients; and a comparator, connected to said absolute value adders, for comparing output values of said absolute value adders with each other, first tap coefficients having a predetermined time period in accordance with said I-axis component, second tap coefficients having said predetermined time period in accordance with said Q-axis component.

5. The interference circuit as set forth in claim 4, wherein said comparator detects one of said absolute value adders whose output signal is a maximum value within the output signals of said absolute value adders.

* * * * *